United States Patent
Leley et al.

(10) Patent No.: US 9,357,263 B2
(45) Date of Patent: May 31, 2016

(54) GUIDE ACQUISITION METHOD IN ABSENCE OF GUIDE UPDATE INFORMATION ON ALL TRANSPONDERS

(71) Applicant: THOMSON LICENSING, Issy de Moulineaux (FR)

(72) Inventors: Suresh Vishwanath Leley, Carmel, IN (US); Thomas Anthony Stahl, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 216 days.

(21) Appl. No.: 14/364,593

(22) PCT Filed: Dec. 17, 2012

(86) PCT No.: PCT/US2012/069992
§ 371 (c)(1),
(2) Date: Jun. 11, 2014

(87) PCT Pub. No.: WO2013/090876
PCT Pub. Date: Jun. 20, 2013

(65) Prior Publication Data
US 2014/0351859 A1    Nov. 27, 2014

Related U.S. Application Data

(60) Provisional application No. 61/576,133, filed on Dec. 15, 2011.

(51) Int. Cl.
*H04N 21/458* (2011.01)
*H04N 21/2665* (2011.01)
(Continued)

(52) U.S. Cl.
CPC ............. *H04N 21/458* (2013.01); *H04H 20/62* (2013.01); *H04H 60/72* (2013.01); *H04N 21/231* (2013.01); *H04N 21/2323* (2013.01); *H04N 21/2385* (2013.01); *H04N 21/23109* (2013.01); *H04N 21/2665* (2013.01); *H04N 21/26208* (2013.01);
(Continued)

(58) Field of Classification Search
CPC ............ H04N 21/458; H04N 21/2665; H04N 21/6405; H04N 21/23109; H04N 21/2385; H04N 21/4508; H04N 21/482; H04N 21/6193; H04N 21/231; H04N 21/2323; H04N 21/26208; H04N 21/4363; H04N 21/4622; H04N 21/6143; H04H 40/90; H04H 20/62; H04H 60/72
See application file for complete search history.

(56) References Cited

U.S. PATENT DOCUMENTS 9,077,855 B2 *    7/2015  Riley .................... H04N 7/165
2003/0106066 A1    6/2003  Sakai
(Continued)

FOREIGN PATENT DOCUMENTS

EP      1605603      12/2005
EP      1953936      8/2008
(Continued)

*Primary Examiner* — Oschta Montoya
(74) *Attorney, Agent, or Firm* — Robert D. Shedd (57) ABSTRACT

Guide acquisition method and apparatus for receiving a satellite broadcast stream containing guide data, encapsulating said broadcast stream containing guide data in a network communication protocol, assigning a multicast address to said broadcast stream containing guide data, transmitting said broadcast stream containing guide data, receiving a request for said guide data wherein said request comprises a satellite network identifier and transmitting a said multicast address in response to said request.

10 Claims, 4 Drawing Sheets

(51) Int. Cl.
| | |
|---|---|
| *H04N 21/6405* | (2011.01) |
| *H04N 21/231* | (2011.01) |
| *H04N 21/2385* | (2011.01) |
| *H04H 20/62* | (2008.01) |
| *H04H 60/72* | (2008.01) |
| *H04N 21/45* | (2011.01) |
| *H04N 21/482* | (2011.01) |
| *H04N 21/61* | (2011.01) |
| *H04N 21/232* | (2011.01) |
| *H04N 21/262* | (2011.01) |
| *H04N 21/4363* | (2011.01) |
| *H04N 21/462* | (2011.01) |
| *H04H 40/90* | (2008.01) |

(52) U.S. Cl.
CPC ....... *H04N 21/4363* (2013.01); *H04N 21/4508* (2013.01); *H04N 21/4622* (2013.01); *H04N 21/482* (2013.01); *H04N 21/6143* (2013.01); *H04N 21/6193* (2013.01); *H04N 21/6405* (2013.01); *H04H 40/90* (2013.01)

(56) References Cited

U.S. PATENT DOCUMENTS

2006/0053451 A1    3/2006  Lockrige et al.
2015/0181275 A1*   6/2015  Zelkowitz .......... H04N 21/4147
                                                            725/70

FOREIGN PATENT DOCUMENTS

| WO | WO2004086245 | 10/2004 |
| WO | WO2007061955 | 5/2007 |
| WO | WO2008002294 | 1/2008 |
| WO | WO2009151433 | 12/2009 |
| WO | WO2011106601 | 9/2011 |

* cited by examiner

GUIDE ACQUISITION METHOD IN ABSENCE OF GUIDE UPDATE INFORMATION ON ALL TRANSPONDERS

PRIORITY CLAIM

This application claims the benefit, under 35 U.S.C. §365 of International Application PCT/US2012/069992, filed Dec. 17, 2012, which was published in accordance with PCT Article 21(2) on Jun. 20, 2013 in English and which claims the benefit of U.S. provisional patent application No. 61/576,133, filed Dec. 15, 2011.

TECHNICAL FIELD OF THE INVENTION

The present disclosure generally relates to digital content systems and methods for delivering content to an end user, and more particularly, to a system and method for providing satellite broadcast guide information in a system without dedicated tuners.

BACKGROUND

Due to the advent of cable television, direct satellite systems, and other television program broadcast systems, viewers have very large numbers of programs from which to select. Sophisticated systems have been developed to assist a viewer in selecting programs to view or record, among which are the Electronic Program Guide (EPG). An EPG is displayed on a display screen as an interface. In essence, an EPG is an interactive, on screen equivalent to listings found in local newspapers or other print media. An EPG interface can provide several different kinds of information about each program that is within the time frame covered by the EPG. The time frame typically ranges from the next hour up to seven days in advance. EPG program information is usually displayed in a two dimensional grid comprising a plurality of program cells wherein each cell corresponds to a particular program. Typically, the EPG program schedule grid has time on one axis and channel number on the other axis.

One such system employing an electronic program guide (EPG) is a system for providing satellite entertainment services and locally stored entertainment services to apartments within a multi-dwelling unit (MDU), dorm rooms within a dormitory, or to paying customers on a people transporter, such as an airplane. The system architecture of the airline system described herein is based on land based systems such as those used in multi-dwelling units (MDU) in the US Market. All of the programming is made available to the user via one unified Electronic Program Guide (EPG) on the seat display. The visual EPG is constructed from several sources. The satellite programming is accompanied by a satellite EPG stream that pertains to the satellite programming while the local content EPG stream is generated locally.

In a satellite receiver the EPG data needs to be acquired continuously to enable the receiver to display correct program information for present and future program slots in the grid guide. This is accomplished in two ways. First. the satellite broadcaster sends guide information on all transponders so that the receiver can acquire it from the currently tuned transponder along with video/audio data. Secondly, the satellite broadcaster sends guide information on only few predefined transponders. The receiver dedicates a separate tuner to acquire the guide information from one of these transponders. This tuner does not get involved in acquiring audio/video or other data corresponding to the current program being watched.

In a system where the satellite broadcast does not provide guide data on each transponder and where the receiver does not have a dedicated tuner to acquire guide data there exists a need to efficiently and continuously acquire electronic program guide data.

SUMMARY

In one aspect, the present invention a method comprising the steps of receiving a satellite broadcast stream containing guide data, storing said guide data, assigning a multicast address to said guide data, receiving a request for said guide data wherein said request comprises a satellite transponder indicator, and transmitting said multicast address in response to said request.

In another aspect, the present invention involves a method of requesting electronic program guide data in a internet protocol network comprising the steps of, receiving a request for guide data containing a first satellite network indicator, replacing said satellite network indicator with a predetermined satellite network indicator to generate a modified request for guide data, transmitting said modified request for guide data, and receiving a multicast address corresponding to said guide data.

In another aspect, the present invention involves an apparatus comprising a first input for receiving a satellite broadcast stream containing guide data, a second input for receiving a request for said guide data wherein said request comprises a satellite network indicator, a memory for storing said guide data, a processor for assigning a multicast address to said guide data and a transmitter for transmitting said multicast address in response to said request.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED SYSTEM DESCRIPTION

The present principles include systems and methods for providing a program guide interface in IP Video Distribution systems. Although the present principles are described herein below primarily within the context of an airplane multimedia distribution system, the specific implementations of the present principles should not be treated as limiting the scope of the invention. It is appreciated by those skilled in the art and informed by the teachings of the present principles that the concepts of the present invention can be advantageously applied in other types of multimedia content distribution systems. For example, the concepts of the present principles can be implemented in any Local Area Network (LAN) based system that distributes satellite broadcasts, cable television broadcasts and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and implementations of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it is appreciated by those skilled in the art that the block diagrams presented herein represent conceptual views of illustrative system components and/or circuitry embodying the principles of the invention. Similarly, it is appreciated that any flow charts, flow diagrams, state transition diagrams, pseudocode, and the like represent various processes which can be substantially represented in computer readable media and so executed by a computer or processor, whether or not such computer or processor is explicitly shown.

The present disclosure relates to the seamless integration of one video service (e.g., locally presented programs and EPG) with a primary video service (e.g., Satellite TV Service) onto a local area network (LAN) where they are multicast to user terminals. The local EPG is generated such that the origin of individual programs may be transparent to the customer. It is presented to the customer as one seamless service. The inserted programs may be locally added to the network (e.g., stored movie or camera) or may be supplied from another broadcast source (e.g., satellite or cable). For simplicity, the locally inserted video and EPG will be referred to as "Local Content" and the process is called "Local Content Insertion."

Such systems have already been created for a US Satellite Service provider. This disclosure presents modifications suitable for different service providers with similar systems.

Figure 1:
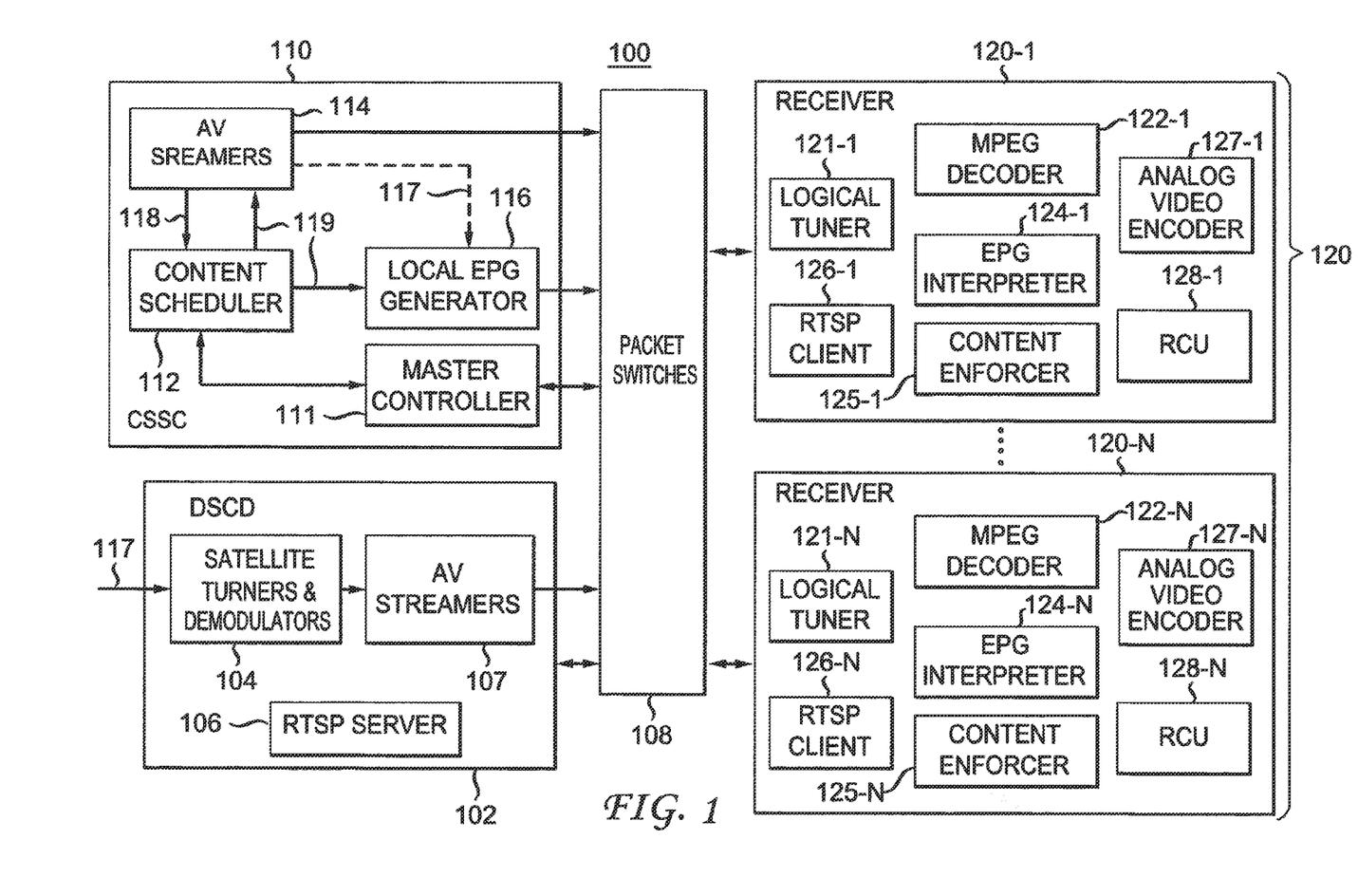
FIG. 1 is a block diagram of an exemplary system for delivering video content and EPG streams in accordance with the present disclosure.

Referring now in specific detail to the drawings in which like reference numerals identify similar or identical elements throughout the several views, and initially to FIG. 1, a high level block diagram of an exemplary IP video content distribution system 100 for providing an electronic program guide for local content and satellite content in accordance with one exemplary implementation of the present principles is illustrated. System 100 can include a Digital Satellite Concentrator and Distributor (DSCD) 102, a Content Server and System Controller (CSSC) 110, Ethernet switches 108 and a series of Receivers 120-1 to 120-N, including Decoders 122-1 to 122-N and EPG Interpreters 124-1 to 124-N, respectively. The receivers 120 can, for example, respectively service video displays for each passenger seat.

The DSCD 102 can act as a satellite gateway for the content distribution system. For example, DSCD 102 can receive video content data streams and corresponding program guide information from a satellite service provider (not shown) along line 117 through satellite tuners and demodulators 104. The satellite audio/video and EPG streams are passed to the Audio Video (AV) Streamers 107 where channels are packaged in IP protocols and are spooled onto the local network. Functions of the DSCD 102 can include modifying received satellite EPG packets to indicate the presence of a local network so that a receiver 120 can acquire the guide for local content generated by the CSSC 110. Additionally, the DSCD 102 can include a Real Time Streaming Protocol (RTSP) Server 106 to service receivers 120 by receiving local and satellite content tuning requests and responding to the receivers 120 by sending corresponding IP multicast group addresses on which requested video streams can be found. Here, the RTSP server 106 can distinguish between tuning requests for local content and tuning requests for satellite content. Further, audio/video content and guide information received from the satellite can be sent by the DSCD 102 to the receivers 120 on an Audio/video Digital Satellite Service (DSS) or Digital Video Broadcasting (DVB) Transport Stream (TS) encapsulated in IP and related protocols through switches 108. Modification of satellite packets can be accomplished in real-time using an e.g., Field Programmable Gate Array (FPGA).

The CSSC 110 can be the primary system controller that is responsible for overall system operation and local content insertion. For example, local content can include a video instructing passengers of customs regulations or a video instructing passengers of safety precautions. However, it should be understood that in other implementations, such as land-based cable television systems, local content insertion can include insertion of live video feeds, such as a front door camera. Further, it should be noted that local content can also comprise entertainment programs or motion pictures stored within CSSC 110. Components of the CSSC 110 can include, inter alia, an AV Streamer or Data Pump 114, a Content Scheduler 112, a Local Electronic Program Guide (EPG) Generator 116, and a Master Controller 111, each of which is discussed herein below.

The AV Streamer 114 can be configured to generate and stream AV content onto the local network at a proper rate. For example, the AV Streamer 114 can aggregate and encapsulate packets from a digital video file into a Real-time Protocol (RTP)/User Datagram Protocol (UDP)/Internet Protocol (IP) stream.

The Local EPG Generator 116 can be configured to generate and stream local EPG streams onto the local network at a proper rate. For example, the EPG Generator 116 can create EPG objects and descriptors based on information it receives from the Content Scheduler 112. It can construct valid fast load and broadcast carousel EPG streams from those objects and can encapsulate the packets into a Real-time Protocol (RTP)/User Datagram Protocol (UDP)/Internet Protocol (IP) stream. In some applications where the Satellite Service is not present, the EPG Generator may construct a Boot Stream.

The Content Scheduler 112 may control insertion of local content and local EPG streams by employing a Local Guide XML file 119 or alternately an API with common data structures. For simplicity, only the use of the XML files for interprocess communication is explained. The Local Guide XML file 119 may include a base time, channel listing, program listings and related information, optional pause functionality for channels, file names of files, and schedules, which can be offset by the base time.

In some implementations of the present principles, the AV Streamer 114 can perform the front end processing for the Local EPG Generator 116 for input from the Content Scheduler 112. For example, the AV Streamer can be configured to monitor the Local XML File 119 corresponding to a schedule of local programming, local content filenames and high-level commands such as "PAUSE." The AV Streamer can monitor the Local Guide XML files for any changes to the status of channels or programs. In addition, the AV streamer 114 can parse XML files and supply guide generation related inputs to the Local EPG Generator 116 through an API 117. In general, the AV Streamer 114 can be controlled through the Local Guide XML file 119 generated by the Content Scheduler 112.

Alternatively, the XML parser can be independent of the AV Streamer 114 and can parse the Local Guide XML file 119 for both the AV Streamer 114 and the Local EPG Generator 116. Alternatively, the AV Streamer and the Local EPG Generator can be independent, each with its own XML parser as shown in FIG. 1.

Further, the AV Streamer 114 can inform the Content Scheduler 112 of the content currently playing, when certain content has finished playing, and the state of the AV streams through a Now Playing (NP) XML File 118. The playing status of content can be useful for pausing or un-pausing content for the display of locally inserted content, as discussed below with respect to the Content Scheduler 112. The format of the NP XML File can include a base time, a timestamp and a channel listing, which can reference all channels. The channel listing can include a channel name, channel objects, which can include a user-recognizable number, name and logo, and program information.

The base time can indicate a time by which all program start times and end times or other events are measured. For example, a base time can be specified as seconds since a predetermined time, e.g., Jan. 6, 1980 12:00 am, and all program start and end times can correspond to the total number of seconds after the base time, i.e., an offset from the base time.

The Master Controller 111 in the CSSC 110 is responsible for all high-level system operation and coordination. It keeps track of passenger credit card payments for each seat, controls DSCD configuration settings, controls the Content Scheduler, and has a private communication channel to elements in the Receivers 120, such as the Content Enforcers 125. It also takes input from an operator's console (not shown).

The entertainment system includes a series of Receivers 120-1 to 120-N. The Receivers 120-1 to 120-N may respectively include Logical Tuners 121-1 to 121-N, MPEG decoders 122-1 to 122N, EPG interpreters 124-1 to 124-N, Content Enforcer 125-1 to 125-N, RTSP Clients 126-1 to 126-N, Analog Video Encoders 127-1 to 127-N, Remote Control Unit (RCU) receivers 1281 to 128-N, Video Display Units (VDUs) (not shown), and credit card readers (not shown) respectively. The Receivers 120 can, for example, respectively service video displays and receive inputs, e.g., passenger commands, from respective RCUs. There is one receiver for each passenger on the airplane.

The Receiver software structure is based on hardware and software used in a standard satellite set-top box (STB) that directly tunes the RF satellite signal. Because of that, it contains a Logical Tuner 121, which takes the place of the RF tuner. Tuning information to the logical tuner includes information such as satellite, transponder frequency, and signal polarity. Once a tuning request is approved by the Content Enforcer 125, this information is turned into a RTSP tune request by the RTSP Client 126.

The MPEG Decoder 122 receives multicast audio/video streams from the network via a network interface and Logical Tuner 121. Local AV streams are transmitted from the CSSC 110 and Satellite AV streams are forwarded onto the local network by the DSCD 102. The MPEG decoder can parse the AV Stream, decode the video, decode audio, and present it to the Analog/Video Encoder for transmission to the VDU and headset (not shown).

The EPG Interpreter 124 receives multicast EPG streams from the network via a network interface and Logical Tuner 121. Local Guide streams are transmitted from the CSSC 110 and satellite guide streams are forwarded onto the local network by the DSCD 102. The EPG Interpreter 124 decodes each guide stream, combines the information from both local and satellite guides, and creates one unified EPG to be presented to the passenger on the VDU. Only channels allowed to be displayed by the Enforcer Table in the Content Enforcer 125 will be displayed in the EPG.

The Content Enforcer 125 works with the EPG Interpreter 124 to display only valid channels for the offered entertainment service. Not all available satellite channels are in the channel lineup. The Content Enforcer 125 also works with the RTSP Client 126 to make sure that only channels that the customer is allowed to see (e.g., has been paid for) can be tuned. The Content Enforcer 125 includes a structure called the Enforcer Table (not shown) which is used to control these actions. The Enforcer Table is created and sent to the Content Enforcer 125 by the Content Scheduler 112 in the CSSC 110.

The Enforcer Table is a structure that provides information, for each channel, required to determine whether or not a channel should be shown in the EPG and if the user may watch programs on that channel. All program access to the Content Enforcer 125 is based on the unique 32-bit channel identifier associated with each channel. This identifier is the channel object ID from the EPG data stream.

A customer/passenger can request to watch a specific channel (local or satellite) by choosing that channel on the EPG using the RCU 128. If the requested channel requires extra payment, the Receiver 120 presents the customer with on screen displays (OSDs) that allow them to pay by credit card. Payment information is sent back to the Master Controller 111 in the CSSC 110 via a separate control channel over the local network. The Content Scheduler 112 in the CSSC then updates the Enforcer Table in the Receiver 120, allowing that channel to be tuned. Once the customer is allowed to watch a channel, the tune request for that channel is transformed into a RTSP Request by the RTSP Client 126 and is sent over the local network to the RTSP Server 106 in the DSCD 102.

The DSCD 102 decides if the RTSP Request is for local content or satellite content depending on the tuning information contained in the RTSP request. If it is for a satellite channel, then the DSCD 102 makes sure that the requested channel is present in an IP Multicast on the local network. It then responds to the Receiver 120 with the IP Multicast Address to which the Receiver 120 should tune to receive the requested AV stream. If it was a request for stored content, the DSCD 102 sends an RTSP response back to the Receiver 120 with the IP multicast address of the AV stream for that local channel. In either case, the Receiver 120 then uses Internet Group Management Protocol (IGMP) to join the correct IP multicast stream.

An implementation of the LCI System for a US Satellite Broadcast system exists in the market. It is desired to modify the system for other markets, in this example, Brazil. There are several differences between the Brazil Satellite broadcasts and the US Satellite broadcasts that create the need for modifications to the Local Content Insertion (LCI) subsystem. DVB-S transport is used for video streams instead of Legacy transport stream. DVB-S transport is used for EPG streams instead of Legacy transport stream. The transponder frequencies and polarities for the Brazil Network 0 are different than those used the US Network 0. The transponder to frequency index mapping for the Brazil Satellite System's Network 0 cannot be represented by a formula like the US system. The current Brazil transponder mapping may not be stable.

Figure 2:
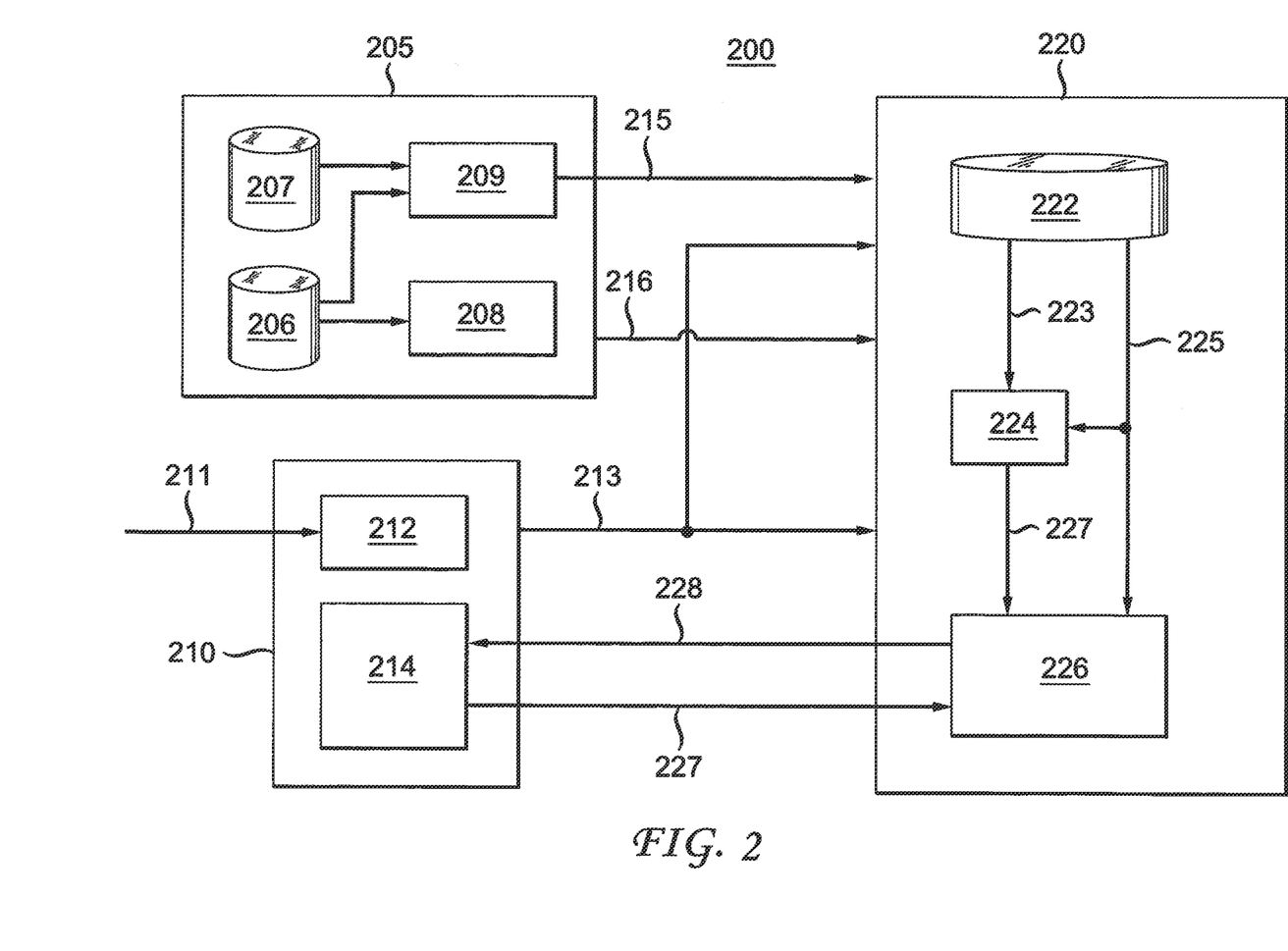
FIG. 2 is a data flow diagram showing EPG streams, AV Streams, and related RTSP traffic between various functions for the US AV Entertainment System.

Turning now to FIG. 2, a data flow diagram 200 showing EPG streams, AV Streams, and related RTSP traffic between various functions for the US AV Entertainment System is shown. For this exemplary embodiment, Local Content Insertion will be used interchangeably with "Local Content." The AV Streams for the US Satellite System are based on a legacy transport stream format that existed before MPEG2-TS. Further, for this exemplary embodiment, these transport streams are similar to MPEG2-TS. Similarly, for the purposes of these system descriptions, Service Channel ID (SCIDs) and Program Identifiers (PIDs) are functionally equivalent. SCIDs are used in Legacy Transport Streams. PIDs are used in MPEG2 Transport Streams. The frequency_index to transponder mapping for US Market Satellite Network 0 is available from the satellite service provider. For US Network 0, the frequency_index to the transponder frequency and polarity mapping follows a formula The polarity can be determined from the frequency_index. For even frequency_indexes, the polarity is Right Hand Circular Polarization (RHCP) and for odd frequency_indexes, the polarity is Left Hand Circular Polarization (LHCP). The Satellite AV Streamer 212 in the DSCD 210 receives the satellite streams 211 and packages them into RTP packets and sends onto the network using an IP Multicast Address from the pool of addresses reserved for satellite streams 213.

Local AV content is stored on a local storage device 207. This content may for stored in MPEG format or converted before coupling to the Local AV Streamers 209. Local AV Streamers 209 package MPEG Transport Streams into IP LCI Multicasts 215. Each Local AV Streamer 209 continually sends the local multicast RTP audio/video packets as long as the stream is not paused by the Master Controller 206 in the CSSC 205.

Out of the IP addresses reserved for LCI Multicasts 215, the first 3 addresses are reserved for Local EPG streams 216. The remaining multicast addresses, reserved for local AV content, are used for streaming audio/video RTP packets for local channels according to a formula.

The Channel_OID_offset for each channel is specified in a data structure loaded by the Content Scheduler. In this exemplary system, the data structure is represented by a Local Guide XML file. The complete 32-bit Channel OID for a channel is determined by adding the Channel_OID_offset to a Base Local Channel_OID. In this exemplary system, the Channel_OID_offset can range from 0 to 0x3F. This limits Local Channel OIDs to the a range The local content AV Streamer 209 uses the same multicast address for audio and video data. The LCI channels are expected to use only values for audio/video SCIDs that are reserved for that purpose. That current range consists of 16 SCIDs.

The following parameters corresponding to the LCI Network are stored in a LCI configuration file used by the Local AV Streamers 209 and EPG Generator 208 in the CSSC 205. Corresponding parameters are stored in a configuration file in the DSCD 210 for use by the RTSP Server 214. The corresponding parameters must match so that the IP Multicast Addresses distributed by the DSCD 210 match the addresses used for the LCI multicasts 215.

Satellite EPG Streams are received by the DSCD and are forwarded onto the network after IP encapsulation in the same way as Satellite AV Streams 213. The satellite EPG Boot Stream includes a Satellite_Descriptor (SD) that contains a table that maps from frequency_index to RF-band selection and tuning parameters. Although a SD describing Network 0 will most likely be present in the Satellite EPG Boot Stream, a default view in the receiver is used if the SD is not found. Both tune requests for Satellite channels and LCI channels use these tune parameters from the SD for tune requests. The (mxuLciConfigMultilpBase+0) multicast address is used for a local Boot Stream when no satellite is present. The (mxuLciConfigMultilpBase+1) multicast address is reserved for the fast load EPG stream. The (mxuLciConfigMultilpBase+2) multicast address is reserved for the broadcast carousel EPG stream.

In the exemplary US System, the US satellite service provider transmits an Additional Network Descriptor (AND) with the reserved network_ID=0xfffe to facilitate Local Content Integration. The AND is carried in a special Channel Object with a specific reserved Channel Object ID (COID). In this example, that number is 0x400000. The CO is also referenced in the Update List Object. In the exemplary system described here, the middleware of the Receiver can be modified, so the actual AND is not required. However, an advantage of some options is that they do not require middleware modifications. Some of these satellite objects aid in middleware independence.

The Local EPG is created and transmitted by the Local EPG Generator 208. Local Channel Objects are constructed to carry the information required to tune the associated AV stream. A unique Channel_OID_offset (COID_offset) is associated with each CO carried in the LCI EPG streams. The Local EPG Generator uses information from the Local Guide XML file provided by the Content Scheduler along with configuration file parameters to calculate the frequency_index and SCID range for each of the local channels using the formulas described next. In this implementation, the network_id is always 0xFFFE. This information is placed in the Channel Objects (COs) carried in the Local EPG streams.

A COID for a LCI channel will be in the range reserved for local channels. Its SCIDs are also in the range reserved for local channels. The COID_offset for each channel is specified in the Local Guide XML file generated by the Content Scheduler in the CSSC. The full COID is determined as previously described. Local EPG Channel Objects include the COID, frequency_index, SCIDs, and network_id. The frequency_index and SCID range will both be determined from the Channel_OID_offset using a formula. The formula uses some of the same configuration parameters shown in Table 1. In particular, the key parameters in the formula are PID Base SCID (PBS), SCIDs per Channel (SPC) and LCI SCID Range (LSR). A unique Channel_OID_offset is provided for each channel by the Content Scheduler.

The middleware of the Receiver 220 derives RF-band Selection and tuning parameters from the EPG database and user's selection. The satellite EPG includes a Satellite_Descriptor (SD) that contains mappings from frequency_index to RF Band Selection and tuning parameters. The Receiver 220 stores this EPG data 222 for the purposes of deriving RF selection and tuning parameters from the CO associated with a chosen channel. Also as previously stated, a channel is referenced to a specific network, frequency_index, and SCIDs in the associated CO.

For the exemplary US system, the Local Network, which is Network 0xFFFE, is overlaid onto Satellite Network 0 (i.e., channels are members of Network 0xFFFE, but streams are found on Network 0). Therefore, Network 0 tuning parameters are used. This is accomplished by placing Transmit Network Descriptors (TND) that point to Network 0 for physical tuning information into each LCI Channel Object. The Receiver uses its view of Network 0 to turn information found in a CO into RF band selection and tuning information, even if from a Local CO.

The RF-band selection and tuning parameters are intercepted by the Receiver's 220 physical network determiner 225 to create an RTSP request 228 instead of directly controlling HW. The p does not pass the network_id in the tuning parameters. The network_id is used in the RTSP requests 228 and must be derived from the tuning and band selection information.

The Receiver 220 puts the physical network_id, tuning frequency, and polarity in the RTSP Request 228 to the RTSP Server 214 in the DSCD 210. For the US System, the network_id could be 0, 1, 2, 3, 7, 10, 11, 14, or 15, but will always be 0 for the local content. For Network 0, the tuning Frequency and polarity are derived from the frequency_index and the STB's view of Satellite Network 0, which is based on the SD received from the satellite or by default.

When a user wants to tune a particular channel, the Receiver RTSP Client 226 sends a RTSP request 228 to the RTSP Server 214. If the RTSP setup request from the Receiver 220 is for a valid network, the request is checked for local channel SCIDs. The Video SCID is the first SCID listed in the applicable Local CO and in the RTSP Request. If the request meets the following criterion then it is considered a local channel request and processed different than satellite channels. RTSP setup requests related to local channels can be a request for local channel guide fastload object. This is indicated by SCID value from request matching with mxuLocalFastLoadScid and frequency index from request matching with mxuLocalFastLoadTransponder. In this case, the reply is sent with multicast address=(mxuLocalMultilpBase+1). Additionally, setup requests related to local channels can be a request for local guide carousel object. This is indicated by scid value from request matching with mxuLocalCarouselScid. In this case, the reply is sent with multicast address=(mxuLocalMultilpBase+2) or s request for local channel video or audio data. This is indicated when the SCID value from the request is in the reserved SCID range (i.e., mxuLciConfigScidBase≤SCID≤mxuLciConfigScidBase+mxuLciConfigScidRange-1).

The RTSP request 228 does NOT include the frequency index. It instead includes frequency and polarity. Therefore, to determine the AV IP multicast address, the RTSP Server first calculates the frequency_index. For AV Streams, The RTSP Server calculates an offset from the frequency index and the Video SCID. The IP multicast address carried in the RTSP Response 227 matches the address used to stream the content referenced by the Local CO from the Local EPG since the EPG Generator 208 and RTSP Server 214 use the same formulas and same values in analogous parameters.

The Brazil Satellite EPG streams follow the same basic EPG specification as the US system, except that the EPG Objects are carried in a MPEG2-TS instead of the US Satellite Legacy Transport Stream. In addition to EPG object encapsulation being different, slightly different EPG objects are also used. For example, the channel objects reference streams using 13-PIDs instead of 12-bit SCIDs. However, these differences are not important for the concepts here, so the previous EPG objects will continue to be used in the discussion.

Currently, the Brazil Satellite Transponders in the Brazil Network 0 are different than the exemplary US system previously described. The Brazil freq_index to transponder frequency and polarity mapping does not follow a formula as the US Network 0 does. There are only 18 transponders instead of 32. Also, the polarities of the transponders are specified as Vertical or Horizontal instead of RHCP or LHCP.

Three possible options are proposed to continue to use the US Satellite freq_index formula with the LCI Network placed on an unused network instead of being overlaid onto one of the satellite networks (i.e., Network 0 in the case of Brazil). These modifications are described in more detail in the following exemplary embodiments. The first places the LCI Network on Network 0xFFFE. The CSSC places the LCI channels on Network 0xFFFE by leaving the Transmit Network Descriptor out of the LCI EPG Channel Objects.

The AV Streams for the Brazil Satellite System are based on DVB-S, which is compliant with the MPEG2-TS specification. Unlike the US Satellite System, the Brazil Satellite System's Network 0 frequency_index to transponder frequency/polarity mapping does NOT follow a formula. The IP multicast addresses for the LCI Subsystem are determined as previously described for the US System. It is expected that the same value for the configuration parameters will be used resulting in e.g., 64 LCI Channels.

The Satellite EPG includes an Advanced Satellite Descriptor (ASD) in the Advanced Boot Stream that contains a mapping from logical parameters, such as frequency_index, to RF-band selection and tuning parameters. Although a ASD describing Network 0 will most likely be present in the Satellite EPG Boot Stream, a default view in the receiver is used if the ASD is not found. The satellite EPG includes an Advanced_Satellite_Descriptor (ASD) that contains mappings from frequency_index to RF-band selection and tuning parameters. The Receiver 220 stores this table for the purposes of deriving RF selection and tuning parameters from the CO associated with a chosen channel. A channel is referenced to a specific network, frequency_index, and PIDs in the CO.

In this exemplary embodiment the Local Network will not be overlaid over Satellite Network 0 as was done in the US system. Instead, since the channels are already members of Network 0xFFFE, they will be mapped onto a new Virtual Network 0xFFFE that uses the same transponder mapping as the US System. The Receiver 220 uses its view of Network 0 and Network 0xFFFE to turn the information in the COs into RF band selection and tuning information, even if based on a Local CO. This is accomplished with a minor change in the Local EPG structure. To use 0xFFFE for the local network ID in the Brazil System, the following changes relative to the US System can be made. The Local EPG Generator 208 in the CSSC should omit "Transmit Network Descriptor" from the Local EPG Streams 216. This will cause the Receiver 220 to use the Network 0xFFFE frequency_index mapping. The Receiver 220 needs a default view of the local network 0xFFFE since it will not receive a Satellite Descriptor for that network when the boot stream originates from the satellite broadcast. It is possible to include an additional Satellite Descriptor to describe Network 0xFFFE when using the Local Boot Stream, but that is only used when satellite service is not available. DSCD 210 will need to be configured or modified to consider 0xFFFE to be a valid network so that the RTSP Server 214 responds to RTSP Requests 228 from Receivers 220 for local channels. Also, for satellite content, the Brazil Receiver will need default view of the BrazilNetwork 0. However, this independent of the option used for the Brazil LCI subsystem implementation.

In this exemplary Brazil System, requests for local content will be for channels on Network 0xFFFE and requests for satellite content will be for channels on Network 0. In this case, the Receiver tuning SW can tell that a request is for Network 0xFFFE if the polarity is RHCP or LHCP. The tune request is for Network 0 if the polarity of the requested transponder is Horizontal or Vertical. The same frequency_index to transponder frequency/polarity mapping used for the US System's local channels will continue to be used for local channels this option. For all options, the Brazil Receiver algorithm must allow frequencies as high as 1.632 GHz instead of cutting it off at 1.45 GHz. See the simplified table below, which shows the modifications:

For the Brazil Satellite System, the only satellite network is Network 0. It uses Vertical and Horizontal Polarizations. There are vertical and horizontal transponders at each frequency. In this option, the Local Network will be Network 0xFFFE and will continue to use LHCP and RHCP polarizations. However, RHCP and LHCP use different frequencies, so the LHCP and RHCP information is not really needed in this option.

The high-level functionality of the RTSP Server that resides in the DSCD is basically the same as that for the US System. The major difference is that Network 0 will be used for satellite channels only. The local channels will all be on Network 0xFFFE and will continue to use the same transponder mapping that was used in the US System. The DSCD is modified (or configured) to consider 0xFFFE a valid network so that the SAP announcing service for that network will be sent to the Receivers on the network.

If the RTSP setup request from the Receiver 220 is for a valid network, the request is checked for local channel PIDs. If the request is for one of the PIDs reserved for LCI, then it is considered a local channel or EPG request and processed different than satellite channels. One possibility is to have local channel tuner parameters are associated with Network 0xFFFE instead of Network 0. To use 0xFFFE for the local network ID in the Brazil System, the Local EPG Generator in the CSSC should omit "Transmit Network Descriptor" from the LCI Fast Load EPG Stream. Additionally, the DSCD will need to be configured or modified to consider 0xFFFE a valid network so that the RTSP Server responds to those RTSP Requests and include Network 0xFFFE in the Network SAP. If configuration is used, then one tuner should be configured to belong to Network 0xFFFE. It could be LHCP or RHCP since the Proxy Server Network SAP does not include "X-dsfe-count," which is used to designate the number of tuners of each polarity for Streamer Network SAPs. This adds 0xFFFE as a valid network and would cause Network 0xFFFE to be included in the Network SAP from the DSCD. The SAP contains the IP address of the Gateway. If the DSCD is modified, then it must recognize 0xFFFE as a valid network (maybe based on the LCI config parameter) and it must include Network 0xFFFE in the Network SAP. The Receiver will need a default view of the local network 0xFFFE since it will not receive a Satellite Descriptor for that network when the boot stream originates from the satellite broadcast. Receiver front-end SW must be modified to designate 0xFFFE as the local network. There may be some additional receiver modifications.

Alternatively, local channels may be associated with Network 0x0001 instead of Network 0. The use of Network 1 The advantage of this is not having to check to see if the Receiver 220 can deal with a network_id as high as 0xFFFE. To use 0x0001 for the local network ID in the Brazil System, the Local EPG Generator in the CSSC should place 0x0001 as the network_id in the "Transmit Network Descriptor" of the Advanced Channel Objects in the LCI EPG Streams. DSCD will need to be configured or modified to consider 0x0001 a valid network so that the RTSP Server responds to those RTSP Requests and include Network 0x0001 in the Network SAP. If configuration is used, then one, possibly two, tuner(s) should be configured to belong to Network 0xFFFE. If one works, it could be LHCP or RHCP since the Proxy Server Network SAP does not include "X-dsfe-count," which is used to designate the number of tuners of each polarity for Streamer Network SAPs. This adds 0x0001 as a valid network and would cause Network 0x0001 to be included in the Network SAP from the DSCD. The SAP contains the IP address of the Gateway. If the DSCD is modified, then it must recognize 0x0001 as a valid network (maybe based on the LCI config parameter) and it must include Network 0x0001 in the Network SAP. The Receiver will need a default view of the local network 0x0001 since it will not receive a Satellite Descriptor for that network when the boot stream originates from the satellite broadcast. Receiver front-end SW must be modified to designate 0xFFFE as the local network. There may be some additional receiver modifications.

Another possible option for modification to the US system is that the LCI will remain overlaid over Network 0. The CSSC will leave the LCI channels on Network 0 by leaving the transmit Network Descriptor in the LCI Fast Load Stream. The Brazil Satellite Network 0 uses different transponders and transponder mapping than is used for US network 0. Since the LCI channels can be distinguished from the Satellite channels based on the PID range or Channel OID, the Receiver SW can treat such requests as an LCI request.

The AV Streams for the Brazil Satellite System are based on DVB-S, which is compliant with the MPEG2-TS specification. The multicast addresses for the LCI Subsystem are determined as previously described for the US System. It is expected that the same value for the configuration parameters will be used resulting in the same IP Multicast Address allocation shown in the description of the US System According to another exemplary embodiment, the Satellite EPG includes Advanced_Satellite_Descriptors (ASD) in the Advanced Boot Stream that contains a mappings from logical parameters, such as frequency_index, to RF-band selection and tuning parameters. Although a ASD describing Network 0 will most likely be present in the Satellite EPG Boot Stream, a default view in the receiver is used if the ASD is not found. The Receiver stores a table of information for the purposes of deriving RF selection and tuning parameters from the CO associated with a chosen satellite channel. A channel is referenced to a specific network, frequency_index, and PIDs in the CO.

Accordingly to this exemplary embodiment, the Local Network will continue to be overlaid over Satellite Network 0 as was done in the US system. However, since the transponder mapping for the satellite channels and local channels are different but both are Network 0, the Satellite Network and the Local Network must be distinguished in some other way within the Receiver. Since the LCI channels use a reserved PID range, LCI channels can be distinguished from the Satellite channels based on the PIDs in the channel request. The Receiver SW will need modifications to examine PIDs (not normally done) and if it is a request for an LCI channel, it must use the LCI transponder mapping to derive frequency and polarity.

To use 0x0000 for the local network ID in the Brazil System, the following changes relative to the US System can be made. The Local EPG Generator in the CSSC should continue to include the "Transmit Network Descriptor" that points toward Network 0 in the Channel Objects in the Local EPG Streams. Therefore, no change is made in the CSSC between the US System and Brazil System. The Receiver needs to check the PIDs in channel tune requests and if the PIDs are in the reserved range for local channels, it must use the transponder frequency and polarity using the formula for the US Network 0. This would be a change to Receiver's middleware.

Also, for satellite content, the Brazil Receiver will need default view of the BrazilNetwork 0. However, this is independent of the option used for the Brazil System implementation. The Receiver's view of LCI Network 0 would be the same as for LCI Network 0xFFFE in Option 1 with the additional restriction on PIDs.

In this exemplary embodiment for the proposed Brazil System, requests for local content will be for channels on Network 0. Since the LCI channels use PIDs from a reserved range, the Receiver uses the PIDs to isolate requests for satellite channels from local channels. If the request is for a satellite channel, the Receiver determines the frequency and polarity of the tune request by indexing into the table loaded by the Advanced Satellite Descriptor from the satellite EPG. Note that in that case, the polarities are vertical or horizontal. If the request is for a local channel, the Receiver will use the formula that represents the transponder mapping. Note in that case the polarities are RHCP or LHCP. The RTSP Requests constructed in the Receiver have the Network ID in the RTSP Request set to 0 for both local and satellite channels.

The high-level functionality of the RTSP Server 214 that resides in the DSCD 210 is basically the same as that for the US System. The RTSP Server 214 will continue to distinguish local channel requests from satellite channel requests based on the PID range. Deriving the frequency index from the transponder frequency for RTSP Requests for local channels is the same as the US System. Calculating the IP Multicast Address is also the same as the US System for this option.

For this exemplary embodiment, the LCI will remain overlaid over Network 0. The CSSC will leave the LCI channels on Network 0 by leaving the transmit Network Descriptor in the Local EPG Streams. LCI continues to use frequency_indexes 0-31 and the US Network 0 frequency_index formula. The Brazil Satellite Network 0 uses different transponder frequencies and frequency_index mapping than is used for US Network 0. Since the LCI channels can be distinguished from the satellite channels based on the PID range, the Receiver SW must treat requests for channels with PIDs in the reserved range as LCI requests. This requires a modification to the middleware/application in the Receiver. If the RTSP server continues to use PID range to determine LCI vs. Satellite, then no change is needed in the DSCD. Local Channels will continue to be associated with Network 0. The US Network 0 formulas would continue to be used.

The Receiver 220 would be modified to recognize LCI PID range and create proper RTSP request parameters. The Receiver 220 would recognize PID range or LCI channel object ID range. Branch into a part of the code that then generates the correct LCI tuning frequency for the frequency index in the applicable Channel Object. PID Range should be configurable (LCI Base PID and LCI PID Range), possibly stored in EEPROM. The receiver would determine LHCP vs. RHCP from frequency_index. Additionally, the receiver would pPass tune frequency & polarization down to the RTSP Client layer. Network number should be correctly determined by the front end SW by examining the polarization. The receiver 220 would modify the Physical Network Determination 224 algorithm to return network 0 when presented with LCI tune frequencies. The Receiver middleware/application may also need a modification to properly display both LCI and Satellite Channels, which are both on Network 0. The Satellite Descriptor only contains reference to 18 transponders, not 32.

In this second exemplary embodiment, the Local Channels will use 32-63 for frequency indexes. The Receiver would need to be modified to allow more than 32 frequency indexes per Network, in this case up to 64. Note that the frequency indexes in Channel Objects use 8 bits. The Receiver would not need to be modified to filter tune requests based on PIDs. Instead, it would have one large view of Network 0 with satellite transponders in the lower range and local transponders in the upper range. The Receiver could therefore operate in the normal way except for the larger number of frequency indexes. Therefore, there is no need for configuration parameters in the Receiver for LCI Base PID and LCI PID Range. The Receiver would need to be modified to leave the default transponders in the upper range (i.e., 32-63) while replacing the transponder entries in the lower range (i.e., 0-31) when it receives the Advanced Satellite Descriptor from the Satellite. The Frequency Index formula would be the same except it would be offset by the constant 32.

A third exemplary embodiment has the local channels mapped onto Brazil Satellite Network 0. This has the disadvantage of creating a dependence of the operation of the local system on the satellite transponders mapping, which may change. However, this option has some advantages, not the least of which is ease in implementation based on the current SW. It is a direct application of all high-level concepts from the US system to the Brazil System. In this case, the US frequency_index formula used in the US system and the first 2 options is not used at all. In Option 3, Brazil Satellite Network 0 "frequency_index to transponder frequency/polarity map" is used for LCI in the same way that the US Network 0 "frequency_index to transponder frequency/polarity map" is used for LCI in the US system.

The PIDs that have already been requested of the Brazil Service Provider for LCI may be used for this exemplary embodiment. To allow enough channels, the entire range of 18 transponders is used. To allow flexibility in the future, the DSCD 210 is modified to allow the transponder map to be loaded via a file during startup. The AV Streamer 209 and EPG Generator 208 in the CSSC 205 would need a new configuration parameter on the number of LCI transponders used or would at least need to be limited to 18 available transponders. Using this option the system can have a $2^{nd}$ phase where the DSCD 210 would automatically acquire the ASD from the Satellite EPG Boot Stream. This would eliminate the need to manually update the transponder map file if the frequency_index to frequency/polarity mapping changes someday. For this exemplary embodiment, only one frequency index is used such as the Boot Transponder. To allow enough channels, a new wider range of PIDs reserved for LCI would need to be used. Note that since PIDs are 13-bits instead of 12, there are twice as many PIDs as SCIDs. Anyway, additional reserved PIDs would need to be negotiated with the Brazil Service Provider.

As with the other exemplary embodiments, the same IP Multicast Address Allocation formula and related configuration parameters that are used in the US Satellite System will continue to be used. Since there are only 18 frequency_indexes in the Advanced Satellite Descriptor (ASD) instead of 32, only 36 channels are supported using the same 8 PIDs per channel. An approach that would allow continued support of at least 64 channels would be to use less audios per channel. This could facilitate 4 channels per transponder.

In this exemplary embodiment, the Local Network will continue to be overlaid onto Satellite Network 0 as was done in the US system. Both Satellite Network 0 and the LCI Network will use the frequency_index to frequency/polarity mapping in the satellite ASD.

In this third exemplary embodiment, the physical network determiner 224 derives RF Band Selection and Tuning Parameters from the EPG database and the user's selection. The RF Band Selection and Tuning Parameters are intercepted by "hijacked-layer" SW in the Receiver 220 to create an RTSP request instead of directly controlling HW. The Physical Network number for the RTSP Request is determined in Receiver front end SW in the US system where the routine should return Network 0 for Satellite and LCI channels, with some error checking.

The Receiver 220 puts the Physical Network ID, Tuning Frequency, and Polarity in the RTSP Request to the RTSP Server 214 via the RTSP client 226. For this option, the Network ID will always be 0. The tuning Frequency and Polarity are derived from the frequency_index and the Receiver's view of Network 0. The RTSP Server 210 will continue to distinguish local channel requests from satellite channel requests based on the PID range. The main difference between this option and the US System is that for this option, the RTSP Server in the DSCD uses a reverse table lookup to find the frequency index from the transponder frequency and polarity that was received in the RTSP request. Since the frequency_index cannot be determined from frequency alone, both frequency and polarity must be used to determine the frequency_Index. Since there is no apparent formula, the function is table driven. Once the frequency_index has been determined, calculating the IP Multicast Address is the same as the US System.

In this option, the LCI will remain overlaid over Satellite Network 0. The CSSC leaves the LCI channels on Network 0 by leaving the Transmit Network Descriptor in the LCI EPG Channel Objects. However in this option, the Brazil Satellite System transponder mapping is used instead of the US Network 0 transponder mapping. In this case, no modification is needed in the Receiver since it simply takes the information from the LCI Channel Objects, and based on the LCI Transmit Network Descriptor, assumes that the logical tuning information in the Channel Object refers to the physical tuning parameters for the Brazil Satellite Network 0. Local Channels will continue to be distinguished from satellite channels based on the LCI Reserved PID Range.

Since it is possible that the frequency index map that is carried in the ASD and is used in the Receiver may change sometime in the future, the inverse frequency index map that is used by the RTSP Server 214 in the DSCD 210 to determine the proper IP Multicast Address must be able to be updated. In the first phase, this update can happen manually. The application in the DSCD 210 reads a file at startup for the frequency map. If that map changes, then the file would need to be manually updated.

Since it may not be immediately obvious that the frequency map has changed the system would have a method to update its view of the frequency index map automatically. Note that for other reasons, the FPGA in the DSCD 210 already parses the Satellite Frequency Identification Stream to retrieve Marker Objects. It would be a straightforward modification of the FPGA to also parse the Boot stream enough to retrieve the Advanced Boot Object that carries the Advanced Satellite Descriptor. The ASD carries the same frequency index map that would be used in the Receiver. So, such a modification solves the issue of the Transponder Map possibly not being stable.

Alternatively, for this exemplary embodiment, only one Transponder may be used if the Boot Transponder does not change. This eliminates the need to use the frequency index map if the stability of the map is not an issue. The requirements for the number of channels and audio streams per channel is met by using a large number of PIDs. For example, to support 64 channels with up to 3 audios per channel requires 256 PIDs.

LCI Multicasts can use the same formula and configuration parameters to determine multicast addresses that are used in the US system. However, there is only 1 frequency_index used in this option. Since PIDs are 13-bits instead of 12, there are twice as many PIDs available as SCIDs. The PIDs used for LCI must be reserved on at least Transponder 0. More audios per channel can be supported with more reserved PIDs. The Receiver's 220 view of Network 0 is controlled by the Advanced Satellite Descriptor received on the Satellite broadcast.

One method of acquiring guide data is to periodically force tune the receiver to the transponder containing guide data. In the in-flight entertainment system there are several instances where the entertainment programming is either paused or replaced with informational videos. For example, during take-off and landing special safety videos are played. At other occasions, Custom and immigration info videos are played. When the aircraft is at the gate special videos containing airline commercials may be played. These videos are "stored content" or local channels. The local channels derive their content from a local server as oppose to a satellite transponder.

These instructional videos can be mapped to any satellite transponder (i.e., frequency_index) as far as the RTSP setup requests from the receiver are concerned. Mapping these local channels to the satellite transponder containing satellite electronic program guide information (e.g., frequency_index 0) allows the receiver to acquire program guide while simultaneously playing local content.

There are other occasions when the entertainment program is paused to broadcast audio messages from the cockpit or cabin crew. During such times the receiver could freeze the screen, then force tune to transponder containing guide data and acquire electronic program guide data, and then revert back to the previous transponder when the pause is removed. The pause and force tuning can all happen under the direction of the CSSC, which has the ability to pause local programs and/or force tune any receiver to any channel via a private IP communication channel.

A second method of acquiring electronic program guide data is to send electronic program guide data on a predefined multicast address. The in-flight entertainment system uses an IP receiver which obtains all its audio/video and program guide data from one or more multicast addresses on the local TCP/IP network. All tune requests are converted to RTSP requests by the receiver. The RTSP requests are processed by the RTSP server in the gateway and the receiver is informed of one or more multicast addresses where it can obtain the requested data. The gateway may then reserve one tuner for electronic program guide data, lock it to the transponder containing guide data. Sends guide data on predefined multicast address. Although the guide carousels are not on all network transponders for some satellite service providers, the Receiver's Application SW still believes that guide carousels are carried on every transponder. So, the Receiver will send an RTSP request for at least one carousel stream on the same transponder as the desired AV stream. The RTSP server then uses predefined PIDs to map all guide requests to the multicast address specified above, while ignoring the specified transponder.

The updating of guide pids can be made automatic in the gateway. All satellite streams go through an FPGA for pid filtering and output stream construction. The FPGA already partially parses the Marker Object in the Frequency Identification stream. It is possible to modify the FPGA to also partially parse Boot Objects and Advanced Boot Objects to read the locations (transponder and pids) of the guide streams.

Alternatively, the gateway may use a different network in RTSP requests for guide pids. The receiver sets network parameter in the RTSP requests from the guide acquisition code to a special predefined network—'guide network'. This guide network is selected such that it does not overlap networks used by the satellite transmission. The gateway dedicates a tuner for guide acquisition, and locks it to the transponder containing guide data, sends any data received on this tuner to a predefined multicast address—guide multicast address.

The RTSP server in the gateway filters all RTSP requests to guide network, it ignores frequency and polarization parameters from the request, and enables the pids specified in the pid list from the request on the guide acquisition tuner. This had the advantage of not requiring prior knowledge of guide pids since all tune requests from the receiver's guide application SW to its drivers are identified as guide requests. Additionally, guide updates are continuous as long as receiver tuned to satellite channel. However, the guide transponder must be configured in the gateway, and any change to guide transponder necessitates reconfiguration of gateway. A system may reserve a transponder frequency that does not match any of the satellite transponder frequencies. The RTSP server would filter on that instead of the network ID.

Another method would be to redesign the receiver so that once it connects to guide streams that are not carried on all transponders, it will keep the guide RTSP session and never tear it down for channel changes, even if the channel changes require changing transponders. This can be done with modifications to the hijack layer that constructs RTSP Requests and does not require modifications of the Receiver's Application SW. This option requires no changes to the Gateway. Note that this is not the same as adding a second logical tuner to the receiver middleware/application, which is a well-known solution.

Figure 3:
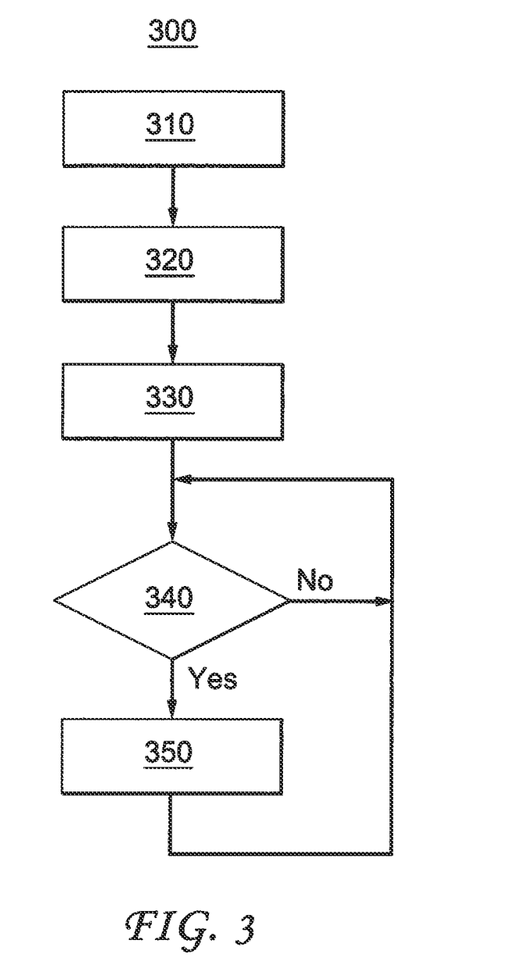
FIG. 3 is a flowchart that illustrates an exemplary embodiment of a method acquiring an electronic program guide over a network EPG on a network according to the present invention.

Turning now to FIG. 3, a flowchart 300 illustrating an exemplary embodiment of a method acquiring an electronic program guide over a network EPG on a network according to the present invention is shown. The system is operative to receive a satellite broadcast stream containing guide data 310. This stream may be received via a satellite broadcast or via a network. Once received, the system then stores the guide data 320 in a memory or a hard drive. The system them assigns a multicast address to said guide data 330. The system waits for a request from a receiver for the guide data. When a request for guide data is received 340, the system extracts the satellite network indicator from the request. The system then transmits a multicast address corresponding to the guide data 350. Thus, for any satellite network indicator, such as transponder, frequency, or PID, the same multicast address is transmitted. The system then returns to wait for another request.

Figure 4:
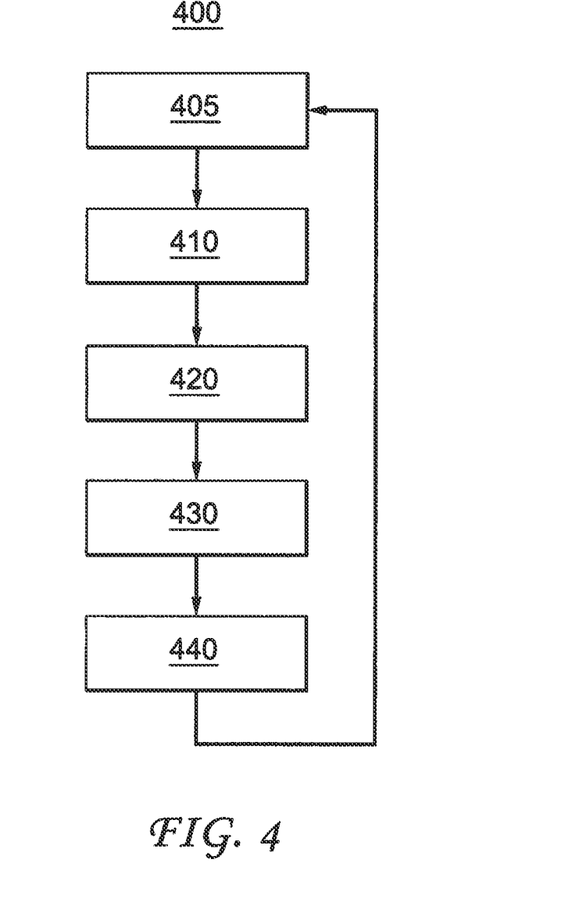
FIG. 4 is a flowchart that illustrates a second exemplary embodiment of a method acquiring an electronic program guide over a network EPG on a network according to the present invention.

Turning now to FIG. 4, a flowchart illustrating a second exemplary embodiment of a method acquiring an electronic program guide over a network EPG on a network according to the present invention is shown. In this exemplary embodiment, a receiver may have middleware installed such that legacy receiver software may be used. The middleware, for example, the Receiver RTSP Client 226 and/or the Physical Network Determination 224 algorithm receives a request from the primary receiver software for the guide data 410. The guide data will include a satellite network indicator indicating the location of the guide data on the satellite network. The middleware replaces this indicator with a predetermined satellite network indicator 420. This predetermined satellite indicator may be a PID, transponder, or frequency. The middleware then transmits this request to the head end, or RTSP server for guide data 430. The RTSP server receives this request, recognizes the predetermined network indicator, and transmits a multicast address corresponding to the requested guide data. The middleware receives this multicast address 400 from the RTSP server. This multicast address is then used to acquire the guide data.

In addition, an exemplary embodiment of a method according to the present invention may be operative to receive a satellite broadcast stream containing guide data, parse guide streams and dynamically generate a list of valid guide PID/SCIDs, encapsulate said broadcast stream containing guide data in network communication protocols, assign a multicast address to said broadcast stream containing guide data and broadcast the said stream, receive a request for data stream wherein said request comprises PIDs from the said dynamically generated list of PID/SCIDs, determine that the request is for guide data based on the PIDs being in the said dynamic list, and transmit a response to said request that includes the multicast address carrying the guide data.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. Having described preferred embodiments for a method and system for the 3D visualization of a disparity map (which are intended to be illustrative and not limiting), it is noted that modifications and variations can be made by persons skilled in the art in light of the above teachings.

The invention claimed is:

1. A method comprising:
   receiving a satellite broadcast stream containing guide data;
   encapsulating said broadcast stream containing guide data in a network communication protocol;
   assigning a multicast address to said broadcast stream containing guide data;
   transmitting said broadcast stream containing guide data;
   receiving a request for said guide data wherein said request comprises a satellite network identifier,
   wherein said request includes one of a plurality of packet identifier and wherein any of said plurality of packet identifiers is mapped to said multicast address;
   transmitting said multicast address in response to said request;
   receiving a second request for said guide data wherein said second request comprises a second satellite network identifier; and
   transmitting said multicast address in response to said second request.

2. The method of claim 1 wherein said satellite network identifier is a reserved transponder index.

3. The method of claim 1 wherein said request is formatted according to a real time streaming protocol.

4. A method of requesting electronic program guide data in an internet protocol network comprising:
   receiving a request for guide data containing a first satellite network indicator;
   replacing said satellite network indicator with a predetermined satellite network indicator to generate a modified request for guide data;
   transmitting said modified request for guide data;
   receiving a multicast address corresponding to said guide data,
   separating said request for guide data from a request for AV streams in response to the source of the request;
   setting the reserved field in the request to indicate a guide stream request;
   receiving a second request for said guide data wherein said second request comprises a second satellite network indicator;
   replacing said second satellite network indicator with said predetermined satellite network indicator to generate a second modified request for guide data; and
   transmitting said second modified request for guide data.

5. The method of claim 4 wherein said modified request for guide data is formatted according to a real time streaming protocol.

6. An apparatus comprising:
   a first input configured to receive a satellite broadcast stream containing guide data;
   a second input configured to receive a request for said guide data wherein said request comprises a satellite network indicator;
   a memory configured to store said guide data;
   a processor configured to assign a multicast address to said guide data; and
   a transmitter configured to transmit said multicast address in response to said request,
   wherein said request consists of one of a plurality of packet identifier and wherein any of said plurality of packet identifiers is mapped to said multicast address, and
   wherein said second input is operative to receive a second request for said guide data wherein said second request comprises a second satellite network indicator and said transmitter is operative to transmit said multicast address in response to said second request.

7. The apparatus of claim 6 wherein said request for said guide data indicates a transponder of a currently streaming audio video stream.

8. The apparatus of claim 6 wherein said request is formatted according to a real time streaming protocol.

9. An apparatus of requesting electronic program guide data in an internet protocol network, comprising:
   a first input configured to receive a request for guide data containing a first satellite network indicator;
   a processor configured to replace said satellite network indicator with a predetermined satellite network indicator to generate a modified request for guide data;
   a transmitter configured to transmit said modified request for guide data;
   a second input configured to receive a multicast address corresponding to said guide data,
   wherein the processor is also configured to:
      separate said request for guide data from a request for AV streams in response to the source of the request, and
      set the reserved field in the request to indicate a guide stream request,
   wherein the first input is also configured to receive a second request for said guide data wherein said second request comprises a second satellite network indicator,
   wherein the processor is also configured to replace said second satellite network indicator with said predetermined satellite network indicator to generate a second modified request for guide data, and
   wherein the transmitter is also configured to transmit said second modified request for guide data.

10. The apparatus of claim 9, wherein said modified request for guide data is formatted according to a real time streaming protocol.

* * * * *